United States Patent [19]
Ward, Jr.

[11] Patent Number: 4,957,376
[45] Date of Patent: Sep. 18, 1990

[54] LINEAR BEARING WITH A HEIGHT ADJUSTMENT MECHANISM

[75] Inventor: Robert E. Ward, Jr., Charlotte, N.C.

[73] Assignee: The Warner & Swasey Company, Cleveland, Ohio

[21] Appl. No.: 354,958

[22] Filed: May 22, 1989

[51] Int. Cl.⁵ .................. F16C 29/06; F16C 23/06
[52] U.S. Cl. .................... 384/43; 29/898.03; 384/39; 384/57
[58] Field of Search ............ 384/38, 39, 40, 43–45, 384/57, 267–269; 29/149.5 R

[56] References Cited

U.S. PATENT DOCUMENTS

| | | | |
|---|---|---|---|
| 406,091 | 7/1889 | Corliss | 384/39 |
| 2,336,351 | 12/1943 | Flowers | 384/39 |
| 4,231,621 | 11/1980 | Tesamachi | 384/45 |
| 4,662,762 | 5/1987 | Schwarz | 384/38 X |
| 4,730,945 | 3/1988 | Luther et al. | 384/57 X |

FOREIGN PATENT DOCUMENTS 2124715  2/1984 United Kingdom ............ 384/44

Primary Examiner—Thomas R. Hannon
Attorney, Agent, or Firm—John R. Benefiel; Raymond J. Eifler

[57] ABSTRACT

A linear bearing (20) with a height adjustment mechanism (58) including a stud (64) fixed to the bearing (20) and a tubular bushing (72) received over the stud (64) and mating with a threaded bore (86) in an end wall (88) of a mounting structure (12). A reaction nut (80) threaded to a protruding end of the stud (64) bears on a protruding end of the bushing (72), the other end bearing against the bearing (20) so that rotation of the bushing (72) in either direction causes a shift of the bearing (20) in either direction. A locking nut (92) threaded onto the bushing (72) is selectively advanced against end wall (88) to lock the bushing (72) in an adjusted position.

6 Claims, 2 Drawing Sheets

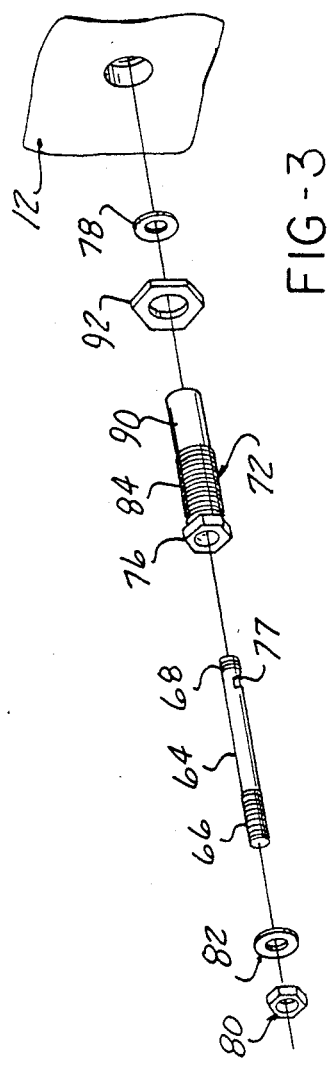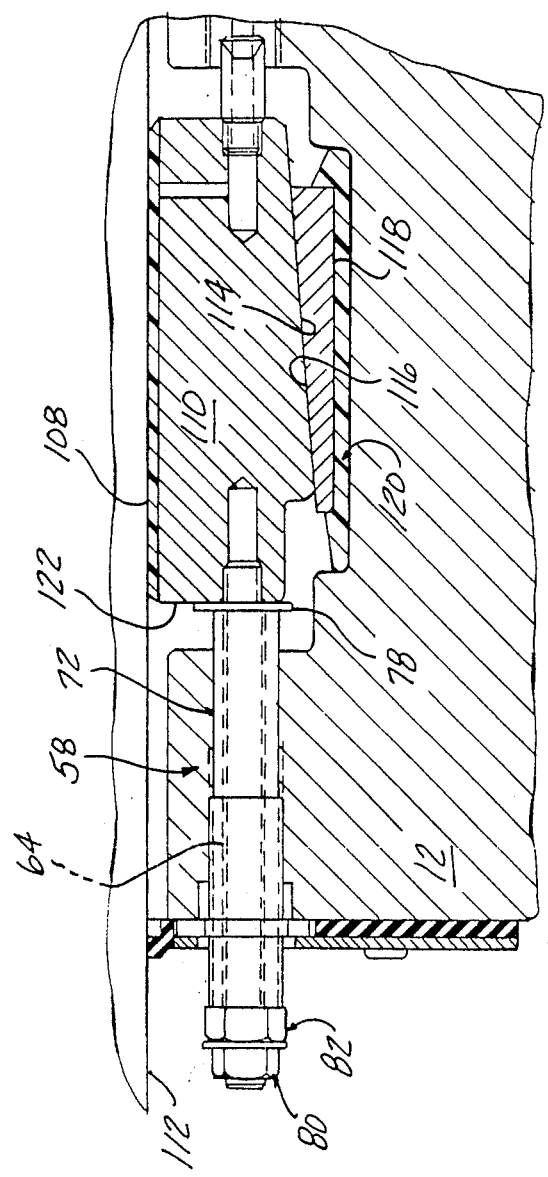

LINEAR BEARING WITH A HEIGHT ADJUSTMENT MECHANISM

This invention concerns linear bearings of the type having a integral preload adjustment mechanism. In U.S. Pat. No. 4,730,945 issued on Mar. 15, 1988 entitled "Integrally Adjustable Bearings" there is disclosed a recirculating roller bearing installation, in which several bearings are mounted in respective recess of a structure. Each bearing has two sets of rollers which support the structure for linear movement along the surfaces of a supporting way.

The rollers recirculate about a track member included in each bearing, the track member and rollers enclosed in a bearing housing. According to the teachings of U.S. Pat. No. 4,730,945, the positions of each bearing in its recess is adjustable in a lengthwise direction so that a height adjustment is obtained by the action of mating inclined surfaces, a gib plate bedded in a precisely fixed position in the recess on the bearing caps on the lengthwise shift of the bearing relative the gib plate thus enables a height adjustment of the bearing, as for achieving a desired bearing preload.

Each bearing must be securely held in a given adjusted position, and an adjustment mechanism is therefore included, comprised of an adjustment screw passing through end wall of the mounting structure defining each recess and threaded into one end of the bearing housing, and a parallel set screw threaded into the end wall protrudes to be forced against the one end of the bearing housing. The adjustment screw requires dished washers to accommodate tilting of the screw as the inclined surfaces act to shift the height of the bearing housing in its recess.

The separate locking screw being offset from the adjustment screw, creates a tendency to tilt the bearing, undesirable for a linear bearing since the path of the rollers is skewed from the direction of movement on the way.

Since the separate locking and adjustment screws must each be adjusted, the lengthwise adjusting process requires the adjustment process is slowed.

SUMMARY OF THE INVENTION

The present invention provides an improved lengthwise adjustment mechanism for linear bearings such as the type described in U.S. Pat. No. 4,730,945.

This adjustment mechanism comprises an elongated stud anchored in one end of the bearing housing and received within a tubular adjustment bushing having one end abutting against that end of the housing, both components extending in a lengthwise direction through a bore formed in an end wall of the bearing mounting structure. The stud protrudes beyond the end of the adjustment bushing and receives a reaction nut advanced against the end of the bushing. The bushing is threaded into the bore in the end wall, and is formed with wrenching flats to enable adjustment of the bearing position by rotation of the bushing in the threaded bore in either direction to act either on the reaction nut or housing to shift the bearing in either lengthwise direction. A locking nut is threadably received over the bushing and may be advanced to engage the wall and frictionally lock the bushing in any adjusted rotational position. The stud is sized to have clearance with the inside of the bushing to allow slight bending thereof in accommodating the change in height of the bearing as the adjustment is carried out.

This mechanism has the advantage of enabling simple adjustment procedures with a minimum number of parts.

A further advantage is the absence of cocking forces acting on the bearing and the secure retention of the bearing in any adjusted position.

DESCRIPTION OF THE DRAWINGS

FIG. 3 is an exploded perspective view of the components of the adjustment mechanism shown in FIG. 2.

FIG. 4 is a lengthwise sectional view of another form of linear bearing incorporating the adjustment mechanism according to the present invention.

DETAILED DESCRIPTION

Figure 1:
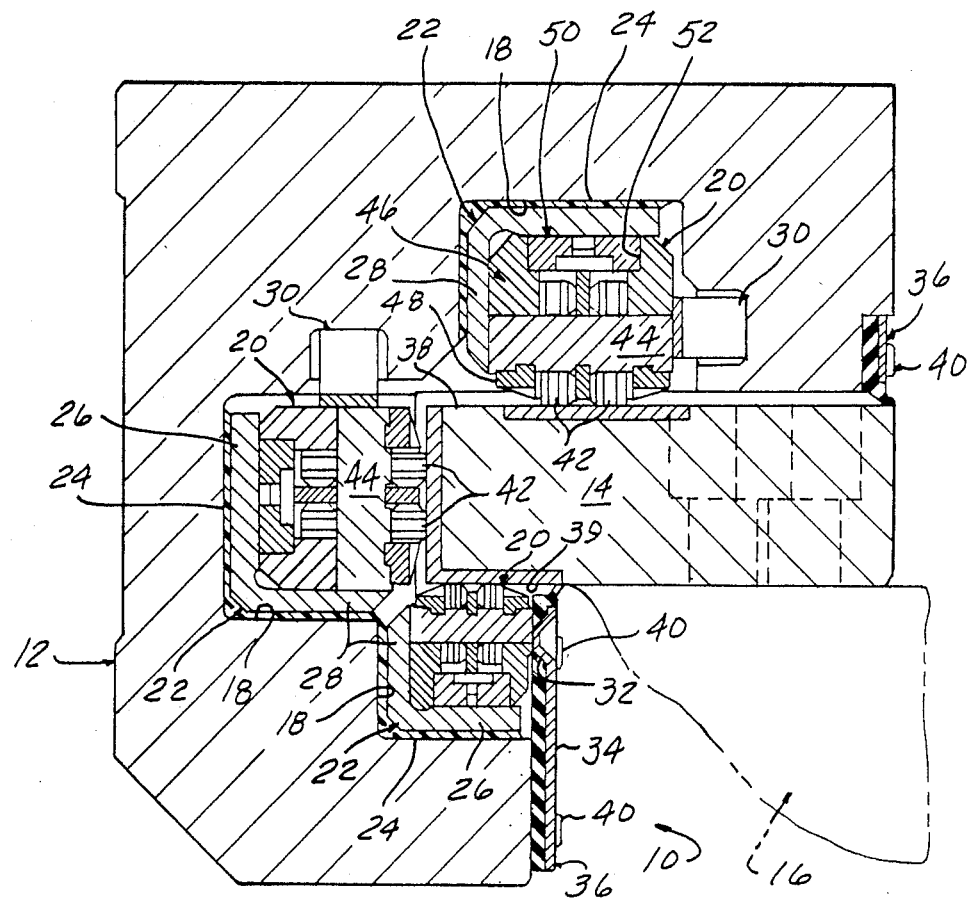
FIG. 1 is a transverse sectional view through a multiple linear bearing installation.

FIG. 1 shows a typical multiple linear bearing installation 10, in which a structure 12 is supported on way 14 attached to a base 16. The structure 12 is formed with an array of recesses 18 into which a roller bearing assembly 20 is received. According to the teachings of U.S. Pat. No. 4,730,945, an angled gib plate 22 is bedded in a mass of epoxy 24 to precisely align the inner surfaces of an aligned side 26 and a lateral side 28 of each gib plate 22. Each bearing 20 is urged against the inner surface of respective lateral side 28 by a spring force generated by flat springs 30 and a proturberance 32 formed in the backing plate 34 of one of the way wiper covers 36 attached with screws 40 to structure 12 to wipe a surfaces 38, 29 of way 14.

Each bearing 20 includes two series of rollers 42 circulating around the perimeter of a track member 44, and confined by an upper housing piece 46 attached to a lower cover 48 of molded plastic. A plug 50 is inserted in an opening 52 formed into the top of the upper housing piece 46, which is utilized to conveniently allow installation of the rollers 42 after assembly of the housing piece 46 and lower cover 48, as well as to provide an alternate lubrication port for applications which do not utilize the preferred lubrication system described herein.

Figure 2:
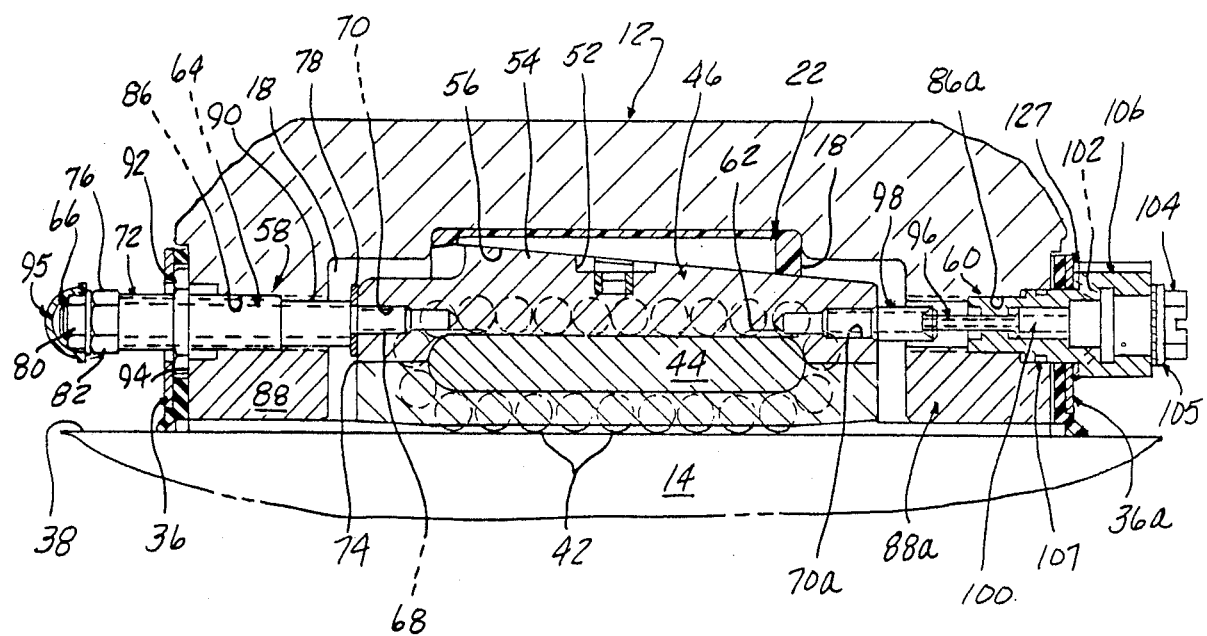
FIG. 2 is a fragmentary lengthwise section view through one of the linear bearings shown in FIG. 1, depicting the adjustment mechanism according to the present invention.

FIG. 2 shows that the top surface 54 of the upper housing piece 46 slopes complementarily to the sloping of the inner surface 56 of the aligned side 26 of the angled gib plate. Thus, as the bearing assembly 20 is advanced or retracted in a lengthwise direction in the recess 18 by an adjustment mechanism 58, the height of the bearing assembly 20 is varied, as to achieve a desired preload or precise location.

A lubrication assembly 60 supplies lubricant to a transverse clearance space 62 between the upper housing piece 46 and the track 44 to direct lubricant to each series of rollers 42.

FIG. 3 illustrates the components of the adjustment mechanism 58, which includes an elongated stud 64 threaded at either end 66, 68, the end 68 received in a threaded bore 70 at one end of the upper housing piece 46 to be secured thereto (FIG. 2), with adjacent wrenching flats 77 formed thereon to facilitate installation. The exposed length of the stud 64 is received within a tubular elongated bushing 72 abutting against the end face 74 of the upper housing piece 46 with an intermediate thrust washer 78, the one threaded end 66, of the stud 64 protrudes beyond the outboard protruding end of the bushing 72, formed with a hex wrenching shape 76. Both the stud 64 and bushing 72 extend in a lengthwise direction.

A stud reaction nut 80 of the self locking type is advanced against the face of bushing outboard end 76 with an intermediate thrust washer 82 so as to be snug, but loose enough to allow rotation of the bushing 72.

The bushing 72 is threaded along its outside diameter for a section 84 adjacent wrenching hex 76 section which is received in a threaded bore 86 extending through an end wall 88 of the structure 12 defining in part the bearing recess 18. The outside diameter section 90 of the bushing 72 adjacent the opposite end is unthreaded and slidably fit within the threaded bore 86. A large diameter locking nut 92 is threaded over the threaded section 84 of the bushing outside diameter, which may be advanced against the face 94 of end wall 88 to secure the bushing 72 in any adjusted position.

The stud 64 is sized to create a substantial clearance space (i.e. 0.025 inches) between it and the interior of the bushing 72, accommodating the slight bending of the stud 64 as the bearing 20 shifts transversely during adjustment because of the engagement of the surfaces 54, 56.

A plastic cover cap 95 may be snap fit over the stud reaction nut 80 to deter wrenching after assembly, as this should not be done as a part of the adjustment process.

The lubrication assembly 60 does not form a part of the present invention, and is described in detail and claimed in copending application Ser. No. 07/355,262 filed on May 11, 1989, attorney docket number CTC-183. Suffice it to say, that an injector tube 96 is telescoped into a bearing lube tube 98 to accommodate the lengthwise movement of the bearing 20 undergone during the above described adjustment. The injection tube 96 receives lubricant under pressure from a metering filter element 100 in turn fed via passages 102 communicating with a supply channel (not shown) in the wiper 36. An end cap 104 seals off the interior of an adaptor 106 housing the compressor and threaded into the structure 12.

It is also noted that the threaded bores 86 and 70 are repeated on either side to allow a reverse installation of the adjustment mechanism 58 and lubrication assembly 60.

FIG. 4 shows the application of the adjustment mechanism 58 to another type of linear bearing in which a layer of bearing material 108 is applied to the face of a bearing block 110 facing a way surface 112. The bearing block 110 is formed with a sloping surface 114 complementary sloping surface 116 of a gib plate 118 bedded in a layer 120 of epoxy resin.

The adjustment mechanism is configured identically to that described above, with an elongated stud 64 threaded at one end into the bearing block 110, a tubular bushing 72 received thereover, and abutting a lateral face 122 of the bearing block 110 with an intermediate thrust bearing 78. The other relationships and components are likewise identical to the above described embodiment.

OPERATION

In order to carry out an adjustment, the locking nut 92 is loosened, and the bushing 72 is rotated in either direction as by wrenching the hex 76. The bushing 72 is thus advanced or retracted in the bore 86 and acts on the upper housing piece 46 either directly or through the reaction nut 80 to shift the bearing assembly 20 any desired distance in the either lengthwise direction, increasing or decreasing the bearing height preload. The locking nut 92 is again tightened to secure the adjusted position.

I claim:

1. In combination with a linear bearing (20) having an improved height adjustment mechanism (58) said bearing (20) installed in a recess (18) defined in a structure (12), adapted to support movement of said structure (12) in a lengthwise direction on a way surface (38), mating sloping surfaces (54, 56) fixed relative to the bearing (20) and structure (12) respectively, causing a height position change of the bearing (20) in the recess (18) upon lengthwise shifting of the bearing (20) relative to the strucutre (12), an adjustment mechanism (58) drivingly interconnecting a wall (88) defining in part said recess (18) in said structure (12), and said bearing (20) allowing selective adjustment of the lengthwise position of said bearing (20) relative to said structure (12), said adjustment mechanism (58) characterized by an elongated stud (64) fixed at one end to said bearing (20) and extending through a bore (88) in said wall (88);

an elongated tubular adjustment bushing (72) received over said stud (64) and threaded to said bore (86) in said wall (88) and having either end protruding from either side of said wall (88), one end engaging said bearing (20);

said stud (64) having an end extending through said wall (88) and protruding beyond the other end of said bushing (72) away from said bearing (20), said protruding end of said stud (64) threaded;

a reaction element (80) threaded to said protruding end of said stud and advanced thereon to be engaged with the other end of said adjustment bushing (72) so as to prevent endwise relative movement thereof in the direction of said reaction element (80), but allowing rotation of said adjustment bushing (72);

the opposite end of said adjustment bushing (72) abutting against said bearing (20), and, a locking element (92) selectively engageable to prevent rotation of said bushing (72) in said bore (86) in said wall (88).

2. The linear bearing (20) according to claim 1 wherein said reaction element (80) comprises a self locking nut (80) threaded to said protruding end (66) of said study (64) and advanced against said protruding end of said bushing (72) away from said bearing (20), remaining fixed at said advanced position because of said self locking action thereof.

3. The linear bearing (20) according to claim 1 wherein said locking element (92) comprises a locking nut (92) threaded onto said protruding portion (84) said bushing (72) and advanced against said wall (88) to selectively lock said bushing (72) against rotation in said bore (86).

4. The linear bearing (20) according to claim 1 wherein the protruding end of said busing (72) is formed with a wrenching shape (76) to enable rotation thereof in said bore (86).

5. The linear bearing (20) according to claim 1 wherein said stud (64) is sized to have a substantial clearance space between the stud (64) and the interior of said bushing (72) to accommodate bending of the stud

(64) as height adjustment of said bearing (20) is carried out.

6. A method of carrying out a height adjustment of a linear bearing (20) mounted in a recess (18) formed in a mounting structure (12), aid structure (12) and said bearing (20) having complementarily shaped sloping surfaces (54, 56) such that upon lengthwise adjustment of the position of said bearing (20) in said recess (18), a bearing height adjustment is achieved, said method characterized by attaching an elongated stud (64) at one end to said bearing (20) extending said stud (64) through a wall (88) forming in part said recess (18), fitting an elongated tubular bushing (72) over said stud (64), and also extending said bushing (72) through a bore (86) in said wall (88) with a threaded engagement between said bore and said bushing; preventing an endwise shifting of said bushing (58) on said stud (64) by means of a reaction element threaded on the stud while allowing rotation thereon; abuttingly engaging said bushing against said bearing (20); rotating said bushing (72) in said threaded bore (86) to shift said bearing (20) in either direction to achieve a desired height adjustment of said bearing (20);

thereafter locking said bushing (72) against rotation in said bore (86) to secure said adjusted bearing position.

* * * * *